(No Model.)
A. ROSENBERG.
WATER MOTOR.
No. 606,361. Patented June 28, 1898.
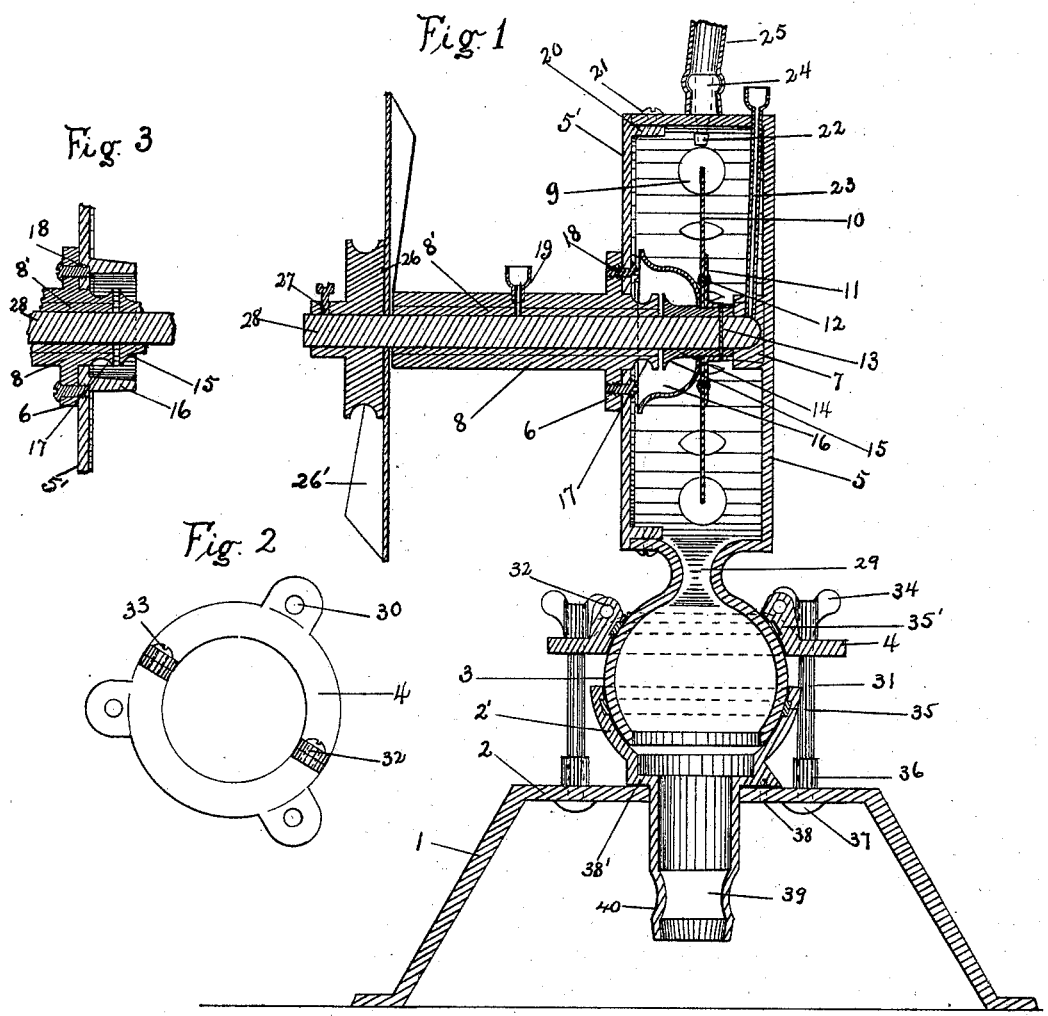
WITNESSES:
C. Edwin Leach
C. A. Leach
INVENTOR
Albert Rosenberg

UNITED STATES PATENT OFFICE.

ALBERT ROSENBERG, OF BALTIMORE, MARYLAND.

WATER-MOTOR.

SPECIFICATION forming part of Letters Patent No. 606,361, dated June 28, 1898.

Application filed May 18, 1897. Serial No. 637,125. (No model.)

*To all whom it may concern:*

Be it known that I, ALBERT ROSENBERG, a citizen of the United States, residing at Baltimore, in the State of Maryland, have invented new and useful Improvements in Water-Motors, of which the following is a specification.

The objects of my invention are, first, to provide a motor with a universal joint to support it from its stand, so that the said motor may be tilted and adjusted in any direction without moving the said stand, this function being exceedingly useful when the motor-spindle is directly attached to a ventilating-fan, and also when the motor is driving a belt it enables the owner to perfectly "line up" the motor with the machine driven and to take up the slack in the belt after the said belt has become stretched from usage without moving the stand or cutting the belt; second, to provide a means for preventing the water from finding its way out of the casing through the bearing.

In the accompanying drawings, Figure 1 is a vertical section of my improved water-motor and a section of the supply-pipe, also showing a pulley and a rotary fan fixed on the spindle. Fig. 2 is a plan view of the clamp-socket. Fig. 3 is another form of the shield.

Referring to the drawings, similar numerals refer to similar parts throughout the views.

The numeral 1 is the leg of the supporting-stand 2, upon which the socket 2' rests, and into this socket is fitted the hollow ball 3, which forms part of the outlet for the motor. This hollow ball is held in place in the socket and is fastened in the different positions assumed by the motor when turned or tilted by the clamp-socket 4. Cast onto this hollow ball is the motor-body or inclosing casing 5 of the motor, the front portion 5' of which is made separate from the motor-body 5, but is fastened to it by means of the lugs 20 and screws 21.

6 is a flange forming the means whereby the front bearing 8, containing antifriction metal 8', is fastened by screws 18 onto the front portion of the motor-body 5'. This front bearing 8 projects into the interior of the motor-body and beyond the inner surface of the front portion 5'. The inner projecting portion of the front bearing 8 is provided with an annular groove 17, forming a flange near the shoulder, and 19 is the lubricant-receptacle for the front bearing 8.

7 is the rear bearing, which is also suitably provided with antifriction metal for the motor-spindle 28, and to this rear bearing is suitably attached the lubricant-cup 23.

9 is one of a number of buckets securely fastened to the disk 10, which in turn is secured to the flange 11 by the rivets 12, which flange is secured to the bushing 14 and motor-spindle 28 by the pin 13. This bushing has an annular flange 15 to form a groove near its shoulder at the end nearest the inner projecting portion of front bearing 8, and to the bushing is also fastened the shell or shield 16, which extends over the inner projecting portion of the front bearing 8; but this shell or shield need not be fastened to the bushing or the spindle, but may be cast onto or form part of the front portion 5', as shown in Fig. 3.

22 is the nozzle of the water-inlet 24, to which is secured the flexible supply-pipe 25.

26 is a pulley fastened by the set-screw 27 to the motor-spindle 28, or the rotary fan 26' may be attached to the said motor-spindle in place of pulley 26. This rotary fan 26' and pulley 26 represent the most common means for transmitting the power furnished by the motor; but I do not limit myself to these particular constructions of a power-transmitting device.

The revolving or working parts of the motor are the buckets 9, disk 10, flange 11, rivets 12, bushing 14, shield 16, pin 13, and spindle 28.

29 is the outlet from the motor-body 5.

30 are lugs cast onto the clamp-socket 4, through which the bolts 31 pass to the supporting-stand 2, which is engaged by the heads 37 of said bolts through the sockets 36, which are cast onto the supporting-stand and which serve to keep the bolts from binding the clamp-socket when the motor-body is rotated or tilted. These bolts are provided with thumb-nuts 34 above the clamp-socket. The clamp-socket 4 is split, so as to allow of it being passed over and around the hollow ball 3, and the lugs 32 and screws 33 are the means whereby the clamp-socket is joined together.

35 are packing-rings, which may be of leather or other suitable material that will retain a lubricant for the hollow ball 3.

38 is a pin engaging the supporting-stand 2 and the seat 38' of the socket 2'.

39 is the outlet from the motor, the nozzle 40 of which may be connected in any suitable way with suitable drain-pipes.

It will be seen that when the motor is running water will splash all over the interior sides of the motor-body; but the annular groove 17 on the inner projecting front bearing 8 will prevent the water flowing down the inner surface of the front portion 5' from getting on the motor-spindle 28. The shield 16 will prevent the water from splashing directly on the exposed portion of the motor-spindle and from getting between the bushing 14 and the front bearing 8. The flange 15 will prevent the water getting on the interior of shield 16 and flowing down on the bushing 14 from reaching the spindle.

It will be seen that the ball-and-socket joint permits the motor to be turned and tilted while running. This feature may be applied to all classes of motors.

I am aware that it is common to employ a socket fixed to a rotatable stand, said socket rotating upon the stand and adjustably supporting a ball secured to a rock-drill, as shown in patent to J. H. Mandeville, No. 164,315, dated June 8, 1875; but this I do not claim; nor do I claim the construction used in flushing spittoons—viz., an open bowl with a centrally-located, but stationary, spindle, upon which revolves a boss connected to jet-tubes, and said bowl adjustably supported by a ball-and-socket joint.

Having described my invention, what I claim, and desire to secure Letters Patent therefor, is—

1. In a water-motor, a casing having a water-wheel therein; a spindle, rigidly secured to said water-wheel, projecting outside of said casing; an inlet to said casing; means for permitting the tilting of said casing; and an outlet from said casing through said tilting means; substantially as described.

2. In a water-motor; a casing having a water-wheel therein; a spindle, rigidly secured to said water-wheel, projecting outside of said casing; an inlet to said casing; a support therefor and means for permitting said casing to be tilted; an outlet from said casing through said tilting means and through said support; substantially as described.

3. In a water-motor, a casing having a water-wheel therein; a spindle, rigidly secured to said water-wheel, projecting outside of said casing; an inlet to said casing; one member, of a joint whereby the said casing may be tilted, secured to said casing; the other member, of said joint, secured to a support; means for securing the members together, and an outlet from said casing through the members of said joint; substantially as described.

4. In a water-motor, a casing having a water-wheel therein; a spindle, rigidly secured to said water-wheel, projecting outside of said casing; an inlet to said casing; means for permitting the universal adjustment of said casing; and an outlet from said casing through said universal adjusting means; substantially as described.

5. In a water-motor, a casing having a water-wheel therein; a spindle, rigidly secured to said water-wheel, projecting outside of said casing; an inlet to said casing; one member of a universal joint rigidly secured to said casing; the other member, of said joint, secured to a support; means for securing the members of said joint together; and an outlet from said casing through the members of said universal joint; substantially as described.

6. In a water-motor, a casing having a water-wheel therein; a spindle, rigidly secured to said water-wheel, projecting outside of said casing; an inlet to said casing; a support therefor and means for permitting the universal adjustment of said casing; and an outlet from said casing through said universal adjusting means and through said support; substantially as described.

7. In a water-motor, a casing having a water-wheel therein; a spindle, rigidly secured to said water-wheel, projecting outside of said casing; an inlet to said casing; a ball rigidly secured to said casing; a socket, for said ball, secured to a support; means for securing the ball in the socket; and an outlet from said casing through said ball and socket; substantially as described.

To which I affix my signature in presence of two witnesses.

ALBERT ROSENBERG.

Witnesses:
C. W. WISNER,
E. EDWIN LEACH.